May 18, 1965     J. R. CARLO     3,183,643
PRODUCE BAGGING APPARATUS

Filed Nov. 19, 1962     4 Sheets-Sheet 1

INVENTOR.
Julius R. Carlo
BY Herbert Berl

May 18, 1965  J. R. CARLO  3,183,643
PRODUCE BAGGING APPARATUS
Filed Nov. 19, 1962  4 Sheets-Sheet 2

INVENTOR.
Julius R. Carlo
BY
Herbert Berl

May 18, 1965

J. R. CARLO 3,183,643

PRODUCE BAGGING APPARATUS

Filed Nov. 19, 1962

INVENTOR.
Julius R. Carlo
BY
Herbert Berl

3,183,643
PRODUCE BAGGING APPARATUS
Julius R. Carlo, 5749 Don Drive, Norfolk, Va.
Filed Nov. 19, 1962, Ser. No. 238,809
3 Claims. (Cl. 53—261)
(Granted under Title 35, U.S. Code (1952), sec. 266)

The invention described herein, if patented, may be manufactured and used by or for the Government for governmental purposes, without the payment to me of any royalty thereon.

In preparing items of food for sale in modern self-service markets, it has become customary to wrap a large number of food items in bags formed by impervious, transparent sheet material and to close or seal the bags to exclude air and retain moisture so that the food items will retain their fresh appearance and resist deterioration for extended periods of time under moderate refrigeration. As the transparent material has a tendency to cling when one layer is super-imposed upon another the filling of bags made of such material can be a tedious and time consuming operation when done by hand. It has been found that the bag filling operation can be sped up and made much more efficient by the provision of a mechanical aid which will open the bags, hold the bags in open condition while the produce is inserted therein, and release the filled bags.

While the device may be used for bagging various items of produce such as head lettuce, celery bunches, grapes and some meat cuts, it has been found particularly useful in bagging poultry carcasses and will be henceforth described with that particular use in mind.

It is among the objects of the invention to provide an improved opening and holding device for poultry bags which device is of lightweight and simple and economical construction and requires no special table or stand since it may be set up upon an ordinary table or counter.

A further object resides in the provision of a poultry bagging device which is easy to operate and can be released by the body of the operator, leaving the operator's hands free at that time to remove the filled bag from the device and place an empty bag on the device for opening and filling.

A still further object resides in the provisions of an improved bagging device which will readily receive empty bags and quickly open the bags to their full capacity without tearing or otherwise damaging the bags.

An additional object resides in the provision of an improved poultry bagging device which is fashioned to a large extent from rust and corrosion resisting materials and is therefore easy to maintain in a clean and sanitary condition and which may be changed to receive bags of different sizes by the exchange of two simple components of the device.

Other objects and advantages will become apparent from a consideration of the following description and the appended claims in conjunction with the accompanying drawings wherein:

Figure 1:
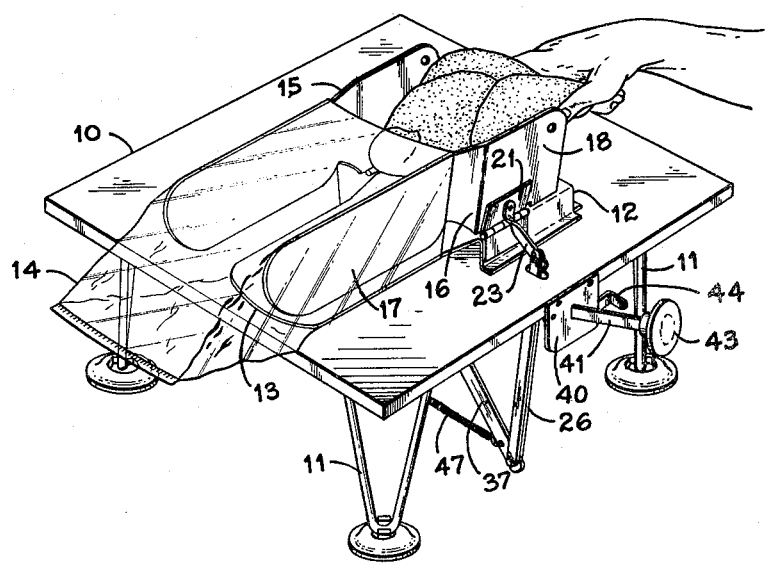
FIG. 1 is a perspective view of a poultry bagging device illustrative of the invention showing the manner in which a bag is held open by the device for the reception of a poultry carcass.
Figure 2:
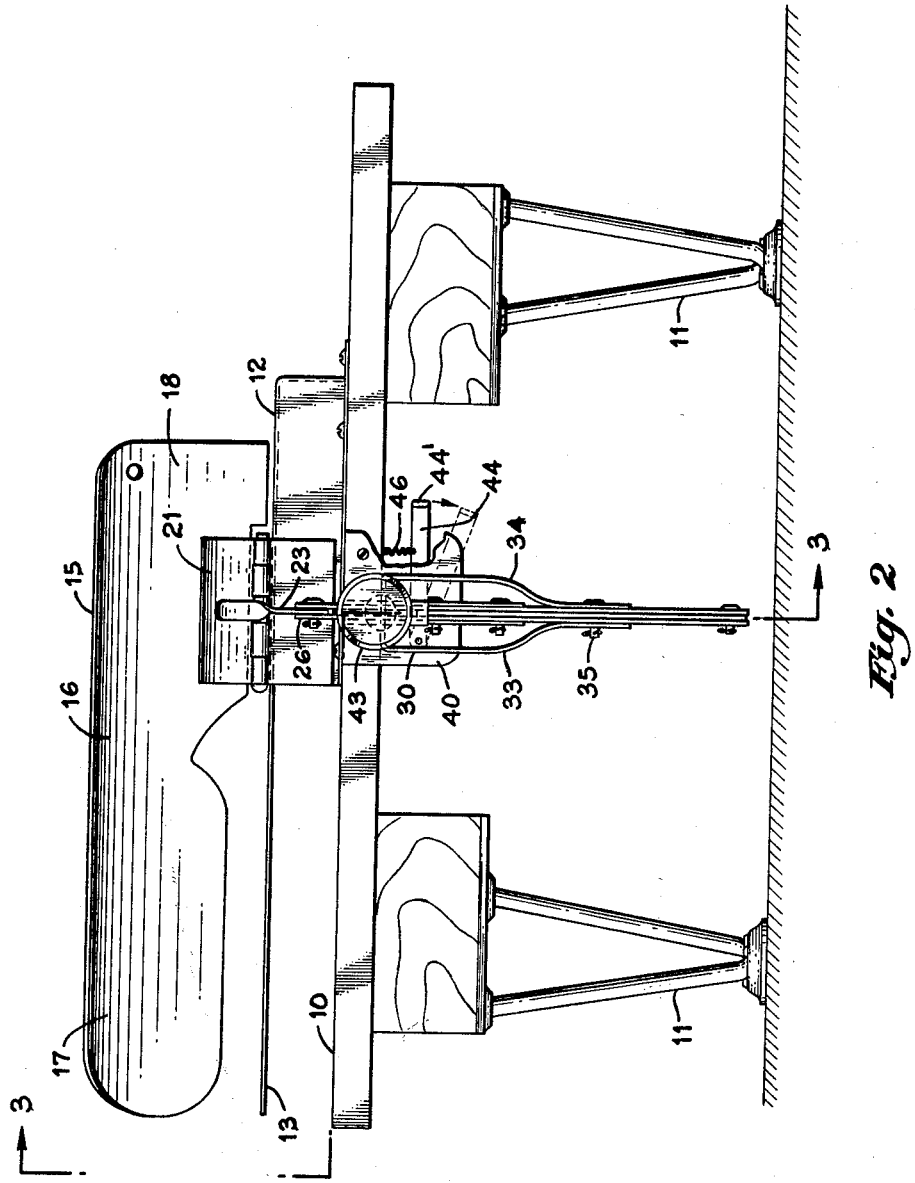
FIG. 2 is an end elevational view of the device.

With continued reference to the drawings, the produce bagging device of the present invention comprises a flat platform 10 of rectangular shape adapted to be supported in horizontal position upon a suitable table or counter at a height convenient for the produce bagging operation. The platform is supported by any suitable means such as the four legs 11 extending downwardly one from each corner portion of the platform.

A thin walled structure 12 is mounted on the platform symmetrically of the width of the platform but nearer one end than the other. This structure is of rectangular shape and includes a flat top wall and sides or flanges extending downwardly from three of the edges of the top wall and secured to the platform. A tongue 13, preferably integral with the top wall of the structure 12, extends from the fourth edge of the top wall toward the end of the platform 10 most distant from the structure 12 and is supported somewhat above and parallel to the upper surface of the platform by the structure 12. This tongue has a curved outer end and has a width somewhat less than the width of a bag 14 to be used with the device and a length less than the length of the bag.

A pair of wings 15 and 16 extend one along each opposite side edge of the tongue 13 and each of these wings is formed to provide two longitudinally arranged parts including a blade part 17 substantially coextensive with the tongue 13 and a base or butt end 18 substantially coextensive with the corresponding upper edge of the structure 12. The blade parts 17 of the two wings 15 and 16 have rounded outer ends, a length substantially the same as the length of the tongue 13 and a width somewhat less than the thickness of the bag 14 when the bag is in fully opened condition.

The structure 12, tongue 13 and wings 15 and 16 are formed of a corrosion resistant, easily cleaned material, stainless steel being preferred for these parts although a suitable plastic or synthetic resin material could be used without in any way exceeding the scope of the invention. The platform 10 also is formed of or has a covering of similar easily cleaned, corrosion resistant material.

Figure 3:
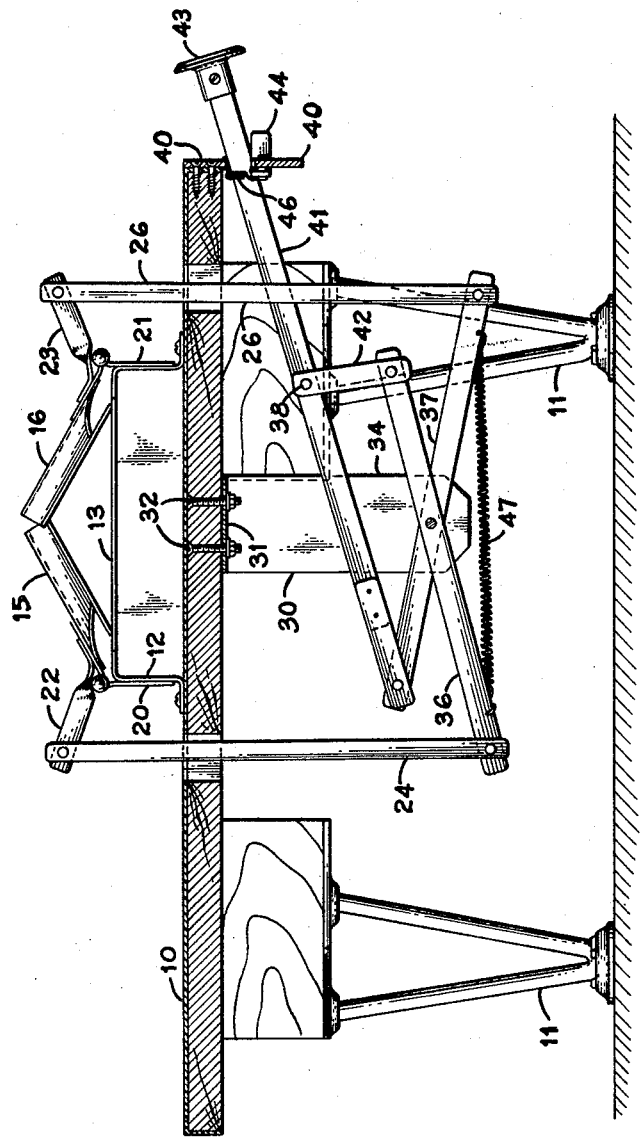
FIG. 3 is a longitudinal cross-sectional view on a plane indicated by the line 3—3 on FIG. 2.

A hinge 20 has one wing thereof secured to the butt portion 18 of the wing 15 and its other wing secured to the corresponding side wall of the structure 12, as shown in FIG. 3, to support the wing 15 for raising and lowering movements relative to the tongue 13. A similar hinge 21 is connected to the butt portion 18 of the wing 16 and to the corresponding side wall of the structure 12 opposite the hinge 20 and supports the wing 16 for similar raising and lowering movements relative to the tongue 13. The wings 15 and 16 are removable between a lower position illustrated in FIG. 3, in which they substantially overlie the tongue 13 and a raised position, illustrated in FIG. 4, in which they upstand substantially perpendicularly from the tongue.

A lever arm 22 is secured at one end to the portion of the hinge 20 supporting the wing 15 and projects outwardly from this hinge and a similar lever arm 23 is secured at one end to and projects outwardly from the portion of the hinge 21 supporting the wing 16.

A link 24 is pivotally connected at its upper end to the outer end of the lever arm 22 and extends downward from this lever arm through an opening or aperture 25 in the platform 10. A similar link 26 is pivotally secured at its upper end to the lever arm 23 and extends downwardly from this lever arm through an opening or aperture 27 of the platform.

A U-shaped plate structure 30 is secured at its intermediate or bight portion 31 to the platform 10 by suitable fasteners such as the bolts 32 and projects substantially perpendicularly downward from the under surface of the platform substantially centrally of the structure 12. The two legs 33 and 34 of this structure are formed to mutually converge toward the lower end of the structure where they are disposed in spaced apart and substantially parallel relationship to each other and are provided near their lower ends with suitable holes to receive the corresponding ends of a pivot pin 35. A pair of flat, cross-over levers 36 and 37 have their intermediate portions disposed between the two legs 33 and 34 of the structure 30 and are provided intermediate their ends with suitable apertures receiving the pivot pin 35. These cross-over levers are disposed substantially in a plane perpendicular to the surface of the platform 10 and to the longitudinal center line of the tongue 13 and are movable relative to each other in a scissor-like manner for a purpose which will presently appear.

Figure 4:
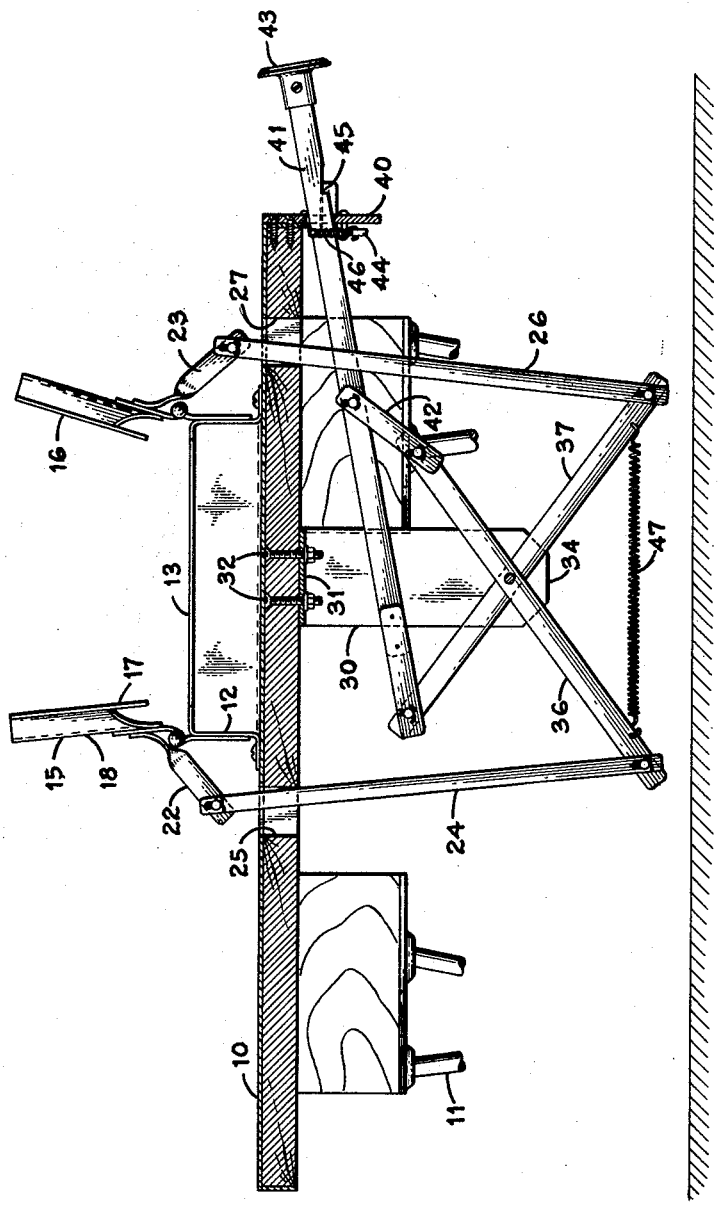
FIG. 4 is a cross-sectional view similar to FIG. 3 but showing the parts in a different operative position from that illustrated in FIG. 3.

The lower end of the lever 36 is connected to the lower end of the link 24 and the lower end of the lever 37 is pivotally connected to the lower end of the link 26. With this arrangement, when the levers are moved toward a horizontal position, the limiting position of such movement being shown in FIG. 3, the links 24 and 26 are moved upwardly thereby lowering the wings 15 and 16 toward a position in which they overlie the tongue 13, the limiting position of this movement of the wings being also shown in FIG. 3. When the levers 36 and 37 are moved from the position shown in FIG. 3 toward a vertical position, the limiting position of this movement being shown in FIG. 4, the links 24 and 26 are moved downwardly thereby raising the wings 15 and 16 to a position in which they extend substantially vertically upward from the tongue 13, as is also shown in FIG. 4.

A flat plate 40 is secured to and depends from one side edge of the platform 10 and this plate is provided with a closed slot which slidably receives an elongated actuating bar 41, this bar extends from the plate 40 past the link 26 and is pivotally secured at its end remote from the plate to the upper end of lever 37. A toggle link 42 connects the upper end of lever 36 to the bar 41 intermediate the length of the bar and the bar is provided at its end at the side of plate 40 remote from the link 37 with a knob 43 for manual actuation of the operating bar.

When the bar 41 is moved inwardly by pressure on the knob 43 levers 36 and 37 are brought to the position shown in FIG. 3 and the wings 15 and 16 are moved to overlie the tongue 13. Bar 41 is releasably latched in this inner position by a latch lever 44 which is pivotally mounted at one end on plate 40 and extends transversely of the plate below the bar 41. Latch lever 44 is urged upwardly by tension spring 46 to engage in a notch or recess 45 in the lower edge of bar 41 and is moved downwardly against the force of spring 46 to release bar 41 by downward pressure on a handle formation 44' projecting perpendicularly from the latch lever.

When the latch lever 44 releases bar 41 the bar is moved outwardly through plate 40 by the action of a tension spring 47. This spring is connected at one end to the pivot pin connecting the lower end of link 24 to the lower end of lever 36 and at its other end to the pivot pin connecting the lower end of link 26 to the lower end of lever 37. Spring 47, by pulling the lower ends of levers 36 and 37 toward each other, tends to move these levers and the links 24 and 26 from the relative positions shown in FIG. 3 to the relative positions shown in FIG. 4 thereby raising the wings 15 and 16.

With the wings 15 and 16 folded down and bar 41 latched in its inward position, as shown in FIG. 3, an empty bag may be drawn over the tongue 13 and the blade portions 17 of the wings 15 and 16, latch lever 44 is then forced downwardly releasing bar 41 and spring 47 then raising wings 15 and 16 to open the bag. The item of produce is then inserted into the bag through the space between the butt portions 18 which serve as guides and along the top wall of the structure 12 and the tongue 13.

The filled bag supported by the tongue is then withdrawn from the device and the bar 41 is pushed inwardly and latched in position to hold the wings in folded down position while another empty bag is placed on the device.

I claim:

1. A produce bagging device for opening an empty bag and supporting same when it is filled comprising an elevated platform, a superstructure secured to said platform having parallel side members and a flat top surface, an elongated bag and produce supporting tongue integral with and projecting from said top surface, an elongated bag opening wing pivotally secured to each of said side members for movement to a lowered bag receiving position in which said wings substantially overlie said tongue thereby enabling a bag to be placed over said wings and said tongue, and to raise bag opening position in which said wings are substantially perpendicular to said tongue to enable the produce to be placed on the tongue in the bag, said wings being substantially coextensive in length with said tongue and said top surface of said superstructure, and operating means to move said wings to the lowered bag receiving position and to the raised bag opening position.

2. The structure of claim 1, wherein said operating means comprises links connected to each of said wings and extending downwardly through said platform, lever means disposed below and supported by said platform and connected to said links, and a manual operating member connected to said lever means and effective to operate said lever means and said links to move said wings.

3. The structure of claim 1, wherein said operating means comprises links connected to each of said wings and extending downwardly through said platform, a plate secured to and projecting downward from said platform, a pivot support adjacent the lower end of said plate, a pair of crossed over levers mounted adjacent their midlength locations on said pivot support and disposed substantially in a plane perpendicular to said platform, means connecting the lower end of one of said levers to the lower end of one of said links and similar means connecting the lower end of the other of said levers to the lower end of the other of said links, a bar connected at one end to the upper end of one of said levers, a toggle link connecting the upper end of the other of said levers to said bar, said bar being manually movable longitudinally of itself to raise and lower said wings, and latch means carried by said platform and engageable with said bar to releasably hold said bar in the position of said bar in which said wings are in the raised position.

References Cited by the Examiner
UNITED STATES PATENTS 2,458,228 1/49 Vredenburg _____ 141—315 XR
2,901,875 9/59 Hultkrans et al. ____ 141—312 XR

FOREIGN PATENTS 689,431 3/53 Great Britain.

LAVERNE D. GEIGER, Primary Examiner.
LOUIS J. DEMBO, Examiner.